United States Patent

Miller

[15] 3,689,731
[45] Sept. 5, 1972

[54] RESISTANCE WELDING ELECTRODE
[72] Inventor: William K. Miller, Southfield, Mich.
[73] Assignee: General Motors Corporation, Detroit, Mich.
[22] Filed: Sept. 7, 1971
[21] Appl. No.: 178,254

[52] U.S. Cl..................................219/119, 219/120
[51] Int. Cl. ...............................................B23k 9/24
[58] Field of Search..............................219/119, 120

[56] References Cited

UNITED STATES PATENTS 3,592,994  7/1971  Ford..........................219/119
2,250,645  7/1941  Meadowcroft et al.....219/120

Primary Examiner—R. F. Staubly
Assistant Examiner—B. A. Reynolds
Attorney—Jean L. Carpenter et al.

[57] ABSTRACT

A spot welding electrode composed of a low resistivity copper alloy has a peripheral slot near the tip to concentrate current flow in the central portion of the electrode. The slot contains a high resistivity steel support material to lend strength to the electrode.

3 Claims, 3 Drawing Figures

PATENTED SEP 5 1972 3,689,731

INVENTOR.
William K. Miller
BY
Warren D. Hill
ATTORNEY

RESISTANCE WELDING ELECTRODE

This invention relates to resistance welding electrodes and particularly to spot welding electrodes having high resistance to deformation and erosion.

In spot welding, two or more sheets of metal are overlapped and placed between a pair of electrodes in a welding apparatus. A surge of electrical current is passed through the electrodes and heat is generated in proportion to the electrical resistance present between the electrodes. This includes the internal resistance of the metal sheets, the contact resistance between the sheets and the contact resistance at the two electrode-sheet interfaces. The electric current is sufficient to locally melt the sheets and the electrodes then serve to contain the molten metal until it solidifies, forming the weld nugget. The electrodes, because they are made from a low resistivity metal, and are water cooled, are not heated sufficiently to melt or to become welded to the steel. In addition to low electrical resistivity, the metal used for a resistance welding electrode should have sufficient strength at its peak operating temperature to withstand the forces which are applied. Also, it should have no reactivity with the metals being welded.

Some of the difficulties which occur with conventional electrodes relate to the compromise which must be made in obtaining the metal characteristics described above. Treatments for improving a metal strength, such as alloying, heat treating and work hardening result in an increase in its electrical resistance. In selecting an electrode material, a compromise between strength and electrical resistance must be made. When the economics of the material also have to be considered, this compromise is usually best made by a few copper alloys. One such alloy is Cu – 1% Cr, which, when age hardened, has appreciable strength yet minimal increase in electrical resistivity over that of pure copper. These copper alloys, however, are not always completely satisfactory since their strength may still be inadequate and they may not be completely non-reactive with the metal being welded. This can result in deformation of the electrode at the welding face, sticking, and erosion of the electrode.

To circumvent these problems, it has previously been proposed to provide a copper electrode with an annular cap on the electrode tip with the copper electrode material extending through the core of the annulus so that the weld face has a central copper portion and a peripheral portion of another material of high resistivity. That design proved to have shortcomings. For example, when slight erosion of the copper portion occurs, only the high resistance cap makes contact with the workpiece resulting in low current flow and poor welds. In addition, difficulties in bonding the cap to the electrode body are present and an expensive material, such as a tungsten alloy, is required to provide the needed strength, electrical properties and non-reactivity with the weld material.

It is therefore a general object of this invention to provide a spot welding electrode having high strength, low resistivity and minimal reactivity with the weld metal.

It is a further object of the invention to provide a resistance welding electrode having the above properties and being easy to fabricate with inexpensive materials.

The invention is carried out by providing a welding electrode designed to concentrate the current flow in the central portion of the electrode face to allow the peripheral portion of the face to remain at a relatively low temperature which is consistent with high electrode strength. More particularly, the invention is carried out by providing a circumferential groove around a low resistivity electrode near the welding face and a supporting insert of high strength, high resistivity material in the groove to maintain electrode strength and to confine most of the welding current to the central portion of the electrode within the boundaries of the groove.

The above and other advantages will be made more apparent from the following specification taken in conjunction with the accompanying drawings wherein like reference numerals refer to like parts and wherein.

Figure 1:
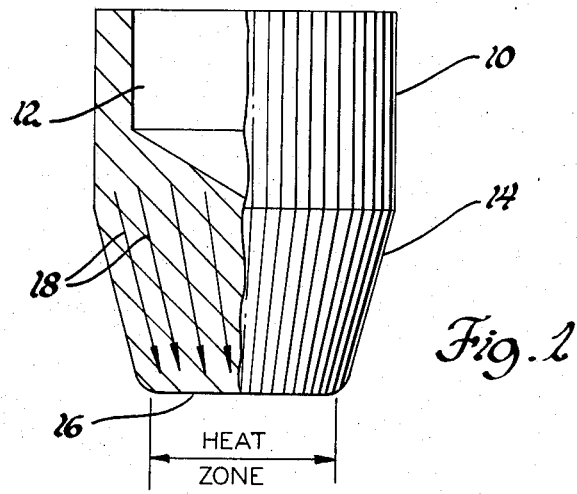
FIG. 1 is a partial cross-section of a conventional spot welding electrode.

This invention comprises an electrode design which controls the flow of electrical current through the electrode in order to reduce the severity of the conditions which the electrode material must withstand. FIG. 1 depicts a typical conventional electrode comprising a body 10 containing a water cooling hole 12, and a tapered tip portion 14 terminating in a weld contact face 16. Current flow, shown by the arrows 18, is more or less uniformly distributed through the tip so that the zone of heat affecting the sheets to be welded and affecting the electrode extends across the full area of the face 16. The high temperatures realized at the face 16 tend to lower the strength of the electrode material to promote deformation and erosion.

Figure 2:
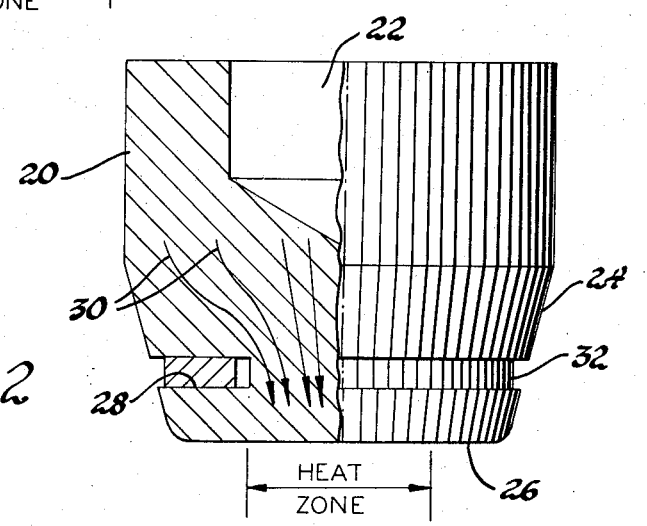
FIG. 2 is a partial cross-section of a spot welding electrode according to the invention.

The electrode according to this invention as shown in FIG. 2 comprises a body 20 which is oversize in diameter compared to the conventional electrode of FIG. 1. The electrode includes a water cooling hole 22 and a tapered tip portion 24 terminating in a weld contact face 26. A circumferential slot 28 closely spaced from the face 26 confines the current flow as shown by the arrows 30 to the central portion of the electrode face so that the zone of weld heat is likewise confined to the central part of the face while the peripheral portions of the face coextensive with the slot 28 are at a substantially lower temperature and therefore maintain a higher strength and greater resistance to deformation and erosion than the hotter central portion to provide structural support for the central portions of the face. The slot 28 is provided with a washer-like insert 32 of a material having high strength at high temperatures and having a high resistivity compared to the material of the electrode body. With Cu – 1% Cr electrode material, austenitic stainless steel is an appropriate material for the supporting insert. That insert material also has adequate heat conductivity to keep the periphery of the electrode face relatively cool. While various dimensions of the electrode are appropriate, depending on the particular welding application, one successful electrode with a ½ inch diameter face employs a slot of one thirty-second inch width and one-eighth inch deep spaced from the electrode face by one thirty-second inch.

Figure 3:
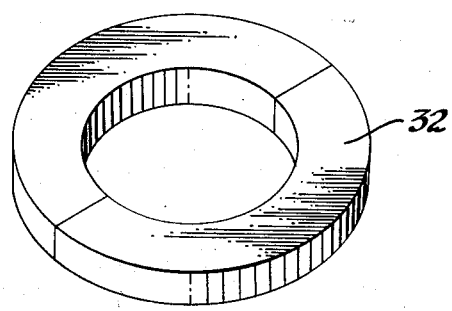
FIG. 3 is a perspective view of a support arrangement of FIG. 2.

As shown in FIG. 3, the insert 32 is preferably comprised of two semi-circular elements which are welded together to hold them in the slot 28, although other means for locking the insert portions into the slot will be readily apparent. Alternatively, the insert 32 may be a unitary washer over which the welding face is upset.

In practice, it has been found that the electrode described herein produced minimal sticking, no expulsion of molten weld metal and only slight indentation of the weld steel sheets, as compared to the performance of conventional electrodes. In addition, the weld nuggets which are produced are more consistent in size than that produced by conventional electrodes and electrode durability is very good.

The embodiment of the invention described herein is for purposes of illustration and the scope of the invention is intended to be limited only be the following claims.

It is claimed:

1. A resistance spot welding electrode having high resistance to deformation and erosion comprising a body portion composed of a high conductivity material and terminating in a work-contacting face composed wholly of the same material as the body, and means spaced from the face for concentrating the flow of welding current in the central portion of the face whereby the radially outer portion of the face maintains high strength and a low temperature relative to the central portion.

2. A resistance spotwelding electrode having high resistance to deformation and erosion comprising a body portion composed of a high conductivity material and terminating in a work-contacting face composed wholly of the same material as the body, and means for concentrating the flow of welding current in the central portion of the face comprising an annular peripheral slot spaced from the face and a support member within the slot composed of low conductivity material whereby the radially outer portion of the face maintains high strength and a low temperature relative to the central portion.

3. A resistance spot welding electrode having high resistance to deformation and erosion comprising a body portion composed of a high conductivity copper alloy material and terminating in a work contacting face composed wholly of the same material as the body, and means for concentrating the flow of welding current in the central portion of the face comprising an annular peripheral slot spaced from the face and a support member within the slot composed of low conductivity steel whereby the radially outer portion of the face maintains high strength and a low temperature relative to the central portion.

* * * * *